(12) United States Patent
Conley, Jr.

(10) Patent No.: US 6,508,324 B1
(45) Date of Patent: Jan. 21, 2003

(54) REGENERATIVE PNEUMATIC PROPULSION APPARATUS

(76) Inventor: Albert Conley, Jr., P.O. Box 7155, Long Beach, CA (US) 90807

( * ) Notice: Subject to any disclaimer, the term of this patent is extended or adjusted under 35 U.S.C. 154(b) by 4 days.

(21) Appl. No.: 09/915,952

(22) Filed: Jul. 26, 2001

(51) Int. Cl.[7] .............................. B60K 6/00; B60K 5/00; B62M 1/10
(52) U.S. Cl. ...................... 180/165; 302/65.5; 302/165; 302/65.2
(58) Field of Search ................................ 180/65.2, 65.5, 180/302, 301, 903, 165

(56) References Cited

U.S. PATENT DOCUMENTS

| | | | | |
|---|---|---|---|---|
| 1,082,047 A | * | 12/1913 | Ross | 180/302 |
| 1,349,036 A | * | 8/1920 | Alstad | 180/302 |
| 1,578,883 A | * | 3/1926 | Estes | 180/302 |
| 3,379,008 A | * | 4/1968 | Manganaro | 180/302 |
| 3,704,760 A | * | 12/1972 | Maruyama | 180/302 |
| 4,123,910 A | * | 11/1978 | Ellison, Sr. | 180/302 |
| 4,355,508 A | * | 10/1982 | Blenke et al. | 180/302 |
| 4,370,857 A | * | 2/1983 | Miller | 180/302 |
| 4,537,269 A | * | 8/1985 | Fisher | 180/302 |
| 4,596,119 A | * | 6/1986 | Johnson | 180/302 |
| 4,798,053 A | * | 1/1989 | Chang | 180/302 |
| 6,202,782 B1 | * | 3/2001 | Hatanaka | 180/302 |

\* cited by examiner

Primary Examiner—Brian L. Johnson
Assistant Examiner—Hau Phan
(74) Attorney, Agent, or Firm—Goldstein & Lavas, P.C.

(57) ABSTRACT

A pneumatic propulsion system includes pneumatic powered motors coupled to a rotatable tubular inner drive member of an axle assembly. The rotatable tubular drive member, for example when installed in a ground traversing vehicle, will be coupled to drive wheels of the vehicle. The pneumatic propulsion system of the invention further includes a plurality of radial compressor units mounted upon the axle assembly, and rotated and driven by the tubular drive member. A controlled release of pressurized air from an included reservoir tank energizes the pneumatic powered motors, causing a rotating of the tubular drive member and a propelling of the vehicle. The rotating of tubular drive member additionally directly drives the compressor units causing air to be pressurized and regeneratively transferred into a pneumatic reservoir tank of the propulsion system.

11 Claims, 5 Drawing Sheets

REGENERATIVE PNEUMATIC PROPULSION APPARATUS

CROSS REFERENCES AND RELATED SUBJECT MATTER

This application relates to subject matter contained in utility patent application Ser. No. 09/193,821, filed in the U.S. Patent Office on Nov. 17, 1998 now abandoned.

TECHNICAL FIELD

The present invention relates most generally to environmentally safe propulsion systems. More particularly, the invention provides a regenerative pneumatic propulsion system usable in a variety of vehicles and devices.

BACKGROUND ART

The need for advanced propulsion systems that are efficient, clean, and environmentally safe is well understood. At present, methods and means enabling pollution-free propulsion are somewhat limited. For example, fuel cell powered vehicles are one example. A well known type of fuel cell utilizes hydrogen and oxygen as a fuel, and produces only water as an 'exhaust' by-product. Given the power densities, especially as a function of weight, hydrogen fuel cells provide an excellent power source for these aforementioned types of propulsion systems. However, as skilled persons will appreciate, a major concern of this promising power technology is the well known volatility of hydrogen. A small leak in the vicinity of a suitable ignition source can result in disaster.

Another approach to providing clean vehicular propulsion may be realized by employing pneumatic principles. Basic pneumatic powered vehicles include an air supply or an air reservoir tank having output lines that are coupled to power and energize pneumatic powered motors. Ideally, if a large enough supply of pressurized air is available, and an efficient motor and drive arrangement are provided, pneumatically powered vehicles may be quite desirable in a number of settings. For example, in cities and other locations having significant pollution problems.

However, previously known prior art pneumatic powered vehicles have been quite complicated in structure and operation. For example, see U.S. Pat. No. 4,370,857 to Miller and U.S. Pat. No. 4,596,119 to Johnson. Many of the disclosed pneumatic structures were large, consuming major portions of the available interior volume of the vehicle. Further, they have generally not been practical when considering their performance characteristics and limited operating range. As such, while useful on scaled down or conceptual vehicles, the presently known pneumatic vehicles were not adequate for general transporting of cargo and passengers for any substantial or practical distance. Improved efficiency of such vehicles and associated structures are needed.

Therefore, skilled individuals will understand a need for improved and efficient propulsion systems to power a large variety of vehicles to enable the transporting of cargo and individuals in an environmentally sound manner. In particular, there is a need for improved 'clean' propulsion means and methods that are not based upon fossil-fuel burning constructions, and that don't pollute. A full understanding of the present invention, including an understanding of a number of capabilities, characteristics, and associated novel features, will result from a careful review of the description and figures of several preferable embodiments provided herein. Attention is called to the fact, however, that the drawings and descriptions are illustrative only. Variations and alternate embodiments are contemplated as being part of the invention, limited only by the scope of the appended claims.

SUMMARY OF THE INVENTION

In accordance with the present invention, a vehicle is powered by a regenerative pneumatic propulsion system including a plurality of directly-driven radial compressor units. The propulsion system may preferably be installed within a vehicle configured with a chassis and a plurality of spaced wheels. At least one pneumatic powered motor is preferably supported upon an axle assembly of the vehicle, with the axle assembly structured having an elongated and hollow configuration. An interior chamber of the axle assembly establishes an interior volume for holding filtered air drawn in from end portions of the axle assembly. The interior chamber is formed in part by an outer wall structure of the axle assembly. The end portions of the outer wall structure are adapted to support filtered air intake ports enabling the filtered air to pass into the interior chamber.

The axle assembly of the present invention is further structured with a rotatable tubular drive member having portions thereof substantially disposed within the outer wall structure and operatively coupled to be driven and rotated by one or more of the pneumatic powered motors. The tubular drive member is suitably mounted and supported within the axle assembly utilizing friction reducing means such as roller bearings, etc. When energized with a flow of pressurized air, a pneumatic powered motor of the propulsion system will cause the rotating of the tubular drive member. Importantly, as at least one spaced drive wheel of the vehicle is coupled to be rotated with the rotatable tubular drive member of the axle assembly, such rotating will result in a propelling of the vehicle.

Another aspect of the present invention provides plurality of radial compressor units. Each of the compressor units, which are preferably substantially disk-like or cylindrical in shape, is preferably disposed in a juxtaposed arrangement, about and operatively coupled to the rotatable tubular drive member. In a most preferred configuration, each radial compressor unit will be positioned in a minimally spaced juxtaposed configuration, and will share a common center rotational axis. The common center rotational axis is occupied by a rotational center of the hollow axle assembly. Therefore, as one or more spaced wheels rotate with the tubular drive member, each 'enabled' compressor unit is structured for drawing filtered air from the interior volume of the axle assembly and producing pressurized air at an air outlet port of the compressor unit. The pressurized air produced by each compressor unit may most preferably be coupled to a pneumatic reservoir tank by way of an in-line pressure activated pneumatic check valve. Each check valve is arranged having an air inlet side and an air outlet side, and is structured for permitting a unidirectional flowing of air from the inlet side to the outlet side. Each air inlet side of a respective check valve is operatively coupled to accept air from an air outlet port of a compressor unit, while each air outlet side is coupled to deliver pressurized air to at least one pneumatic reservoir tank. As skilled individuals will understand, the use of the pneumatic check valve is useful for operational reasons, and will also add a degree of fault tolerance should one of a plurality of compressor units fail to operate properly.

The propulsion system of the invention also includes a means to enable an operator of the vehicle to couple a selected and adjustable flow of pressurized air from the reservoir tank to one or more pneumatic powered motors. This enables the operator to regulate the power produced by the pneumatic powered motors to power the vehicle in a controlled and desired manner. The means may most preferably be configured to couple pressurized air to a selected line(s) of a plurality of lines, each of which is coupled to a pneumatic powered motor. The particular lines selected and supplied with pressurized air may control a rotational rate, an applied rotational torque level, and or a direction of rotation, for rotating one or more drive wheels of the vehicle.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

PARTIAL LIST OF REFERENCE NUMERALS

10—pneumatic propulsion system
12—vehicle
12a—chassis (of vehicle 12)
14—wheel
14a—rotatably mounted drive hub
16—pneumatic powered motor
18—axle or axle assembly
18a—(rotatable) tubular drive member
20—outer wall structure (of axle assembly 18) interior chamber
22—battery module
24—generator (or alternator)
26—air powered motor
26a—electronically adjustable pneumatic valve
28—operator controlled accelerator
30—forward/reverse control
32—air output coupler
34—electronics and control module
35—pneumatic control module
36—pneumatic check valve
36a—air inlet side (of 36)
36b—air outlet side (of 36)
38—pressurized air coupling
40—reservoir tank(s)
40a—pneumatic filler port or valve
40b—over pressure release valve
42—pressure gauge
44—pneumatic outlet coupling or line
46—pneumatic drive coupling
46a—exhaust air coupling
48—filtered air intake port
50—brake unit
52—braking control module
52a—braking control input
54—(operator controlled) brake actuator
56—brake pneumatic coupling and or control line
60—electronic control lines
70—compressor unit or radial compressor unit
72—housing (of 70)
72a—cylindrical sleeve portion
72b—side plates
78—compression rotor
78a—sleeve contacting rotor point (of 78)
80—air outlet block
82—air blade mechanism
82a—air blade
82aa—wiping edge (of 82a)
82b—bias spring
82c—wiping seal
84—housing of 80
84a—housing block
84b—housing cover
86—sub-chamber
88—trough
88a—curved surface (of trough)
88aa—bottom region (88a)
90—axial (center) bore
92—(general) air outlet port
92a—first (forward) air outlet port
92b—second (reverse) air outlet port
94—coupling key
98a—radial bore
98b—air passage hole (of 18a)
98—air passage (98a and 98b)
100—pressurized air

DETAILED DESCRIPTION AND MODES OF THE INVENTION

Figure 1:
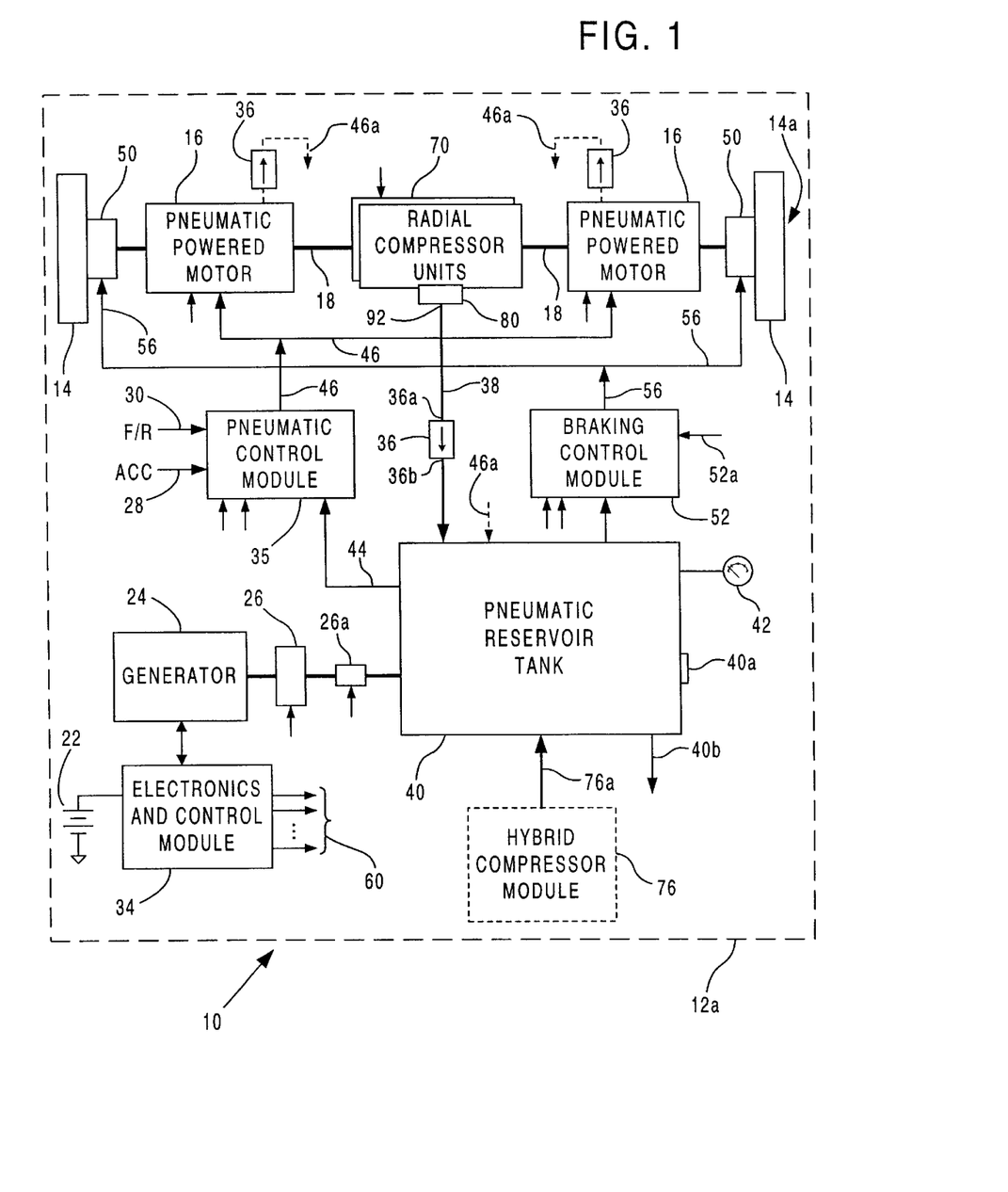
FIG. 1 provides a high level block diagram an embodiment of a pneumatic propulsion system in accordance with the invention that is adapted to a wheel driven vehicle.
Figure 2:
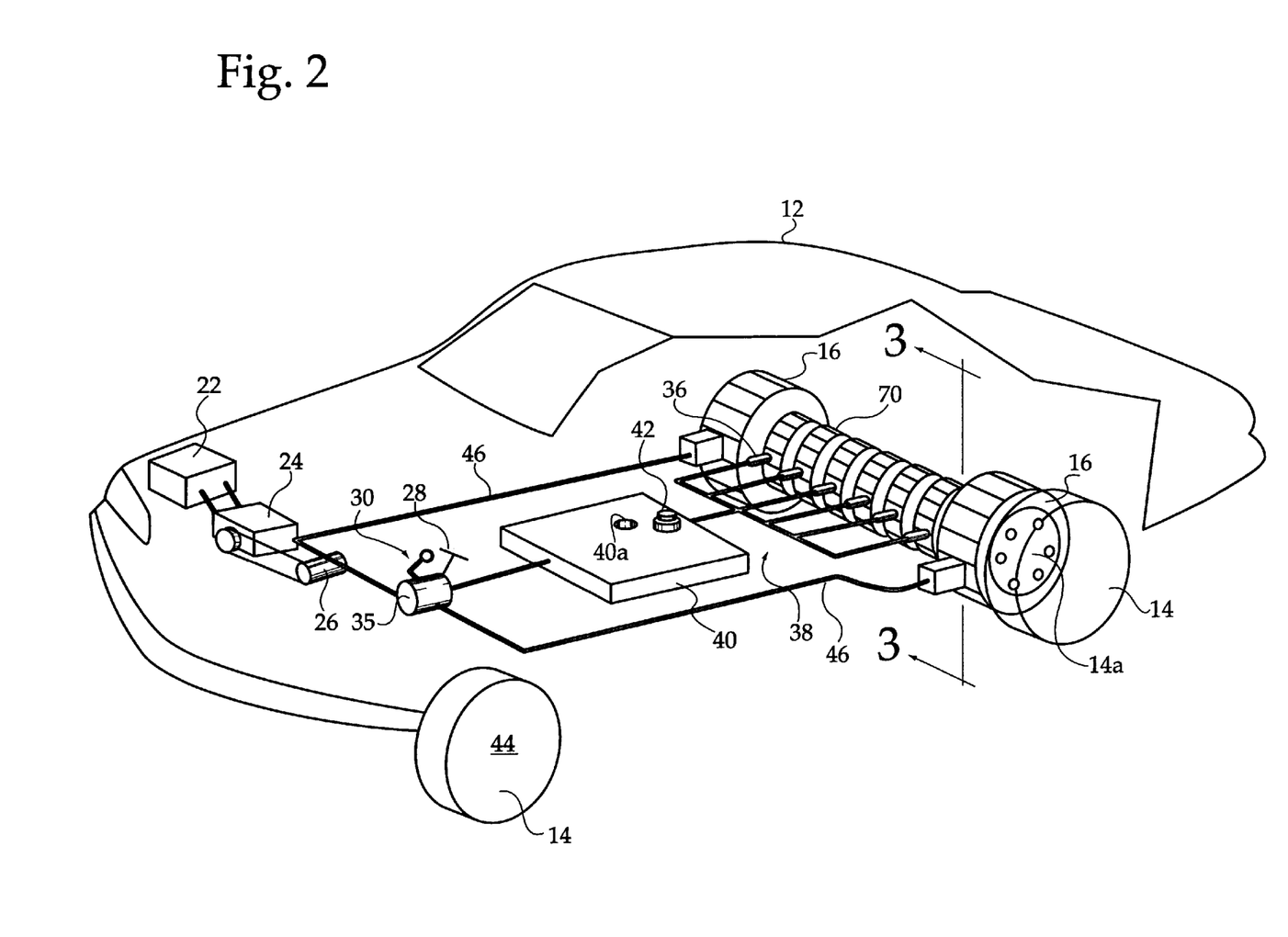
FIG. 2 a conceptual perspective view of an embodiment of a pneumatic propulsion system of the invention installed in a wheeled vehicle.

Referring now to the drawings, FIG. 1 provides a high level block diagram a preferred embodiment of a regenerative pneumatic power or propulsion system 10 in accordance with the invention. As shown, the propulsion system 10 includes an axle or axle assembly 18, having operatively coupled thereto a plurality of preferably directly driven radial compressor units 70. The propulsion system 10 may be installed within a vehicle 12, as best seen in FIG. 2, which is configured with a chassis 12a and a plurality of spaced wheels 14. At least one pneumatic powered motor 16 is supported upon the axle assembly 18 of the vehicle 12.

Figure 3:
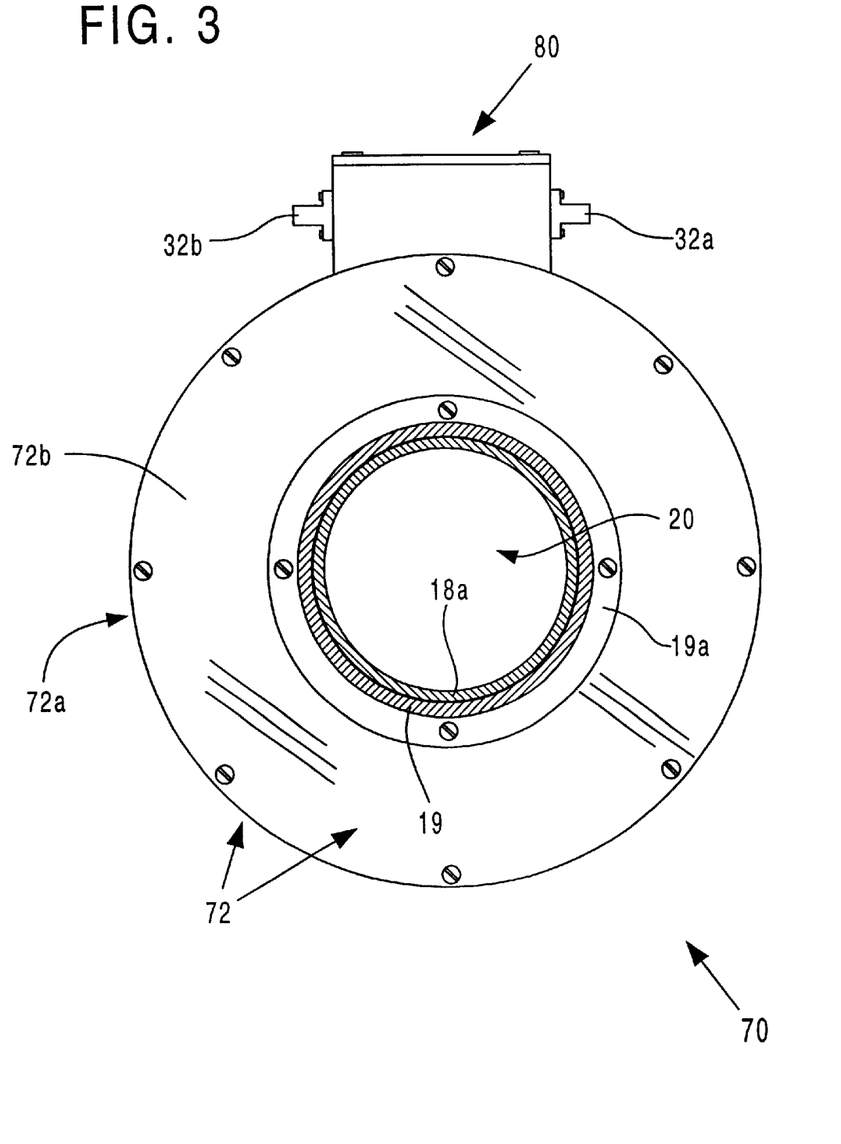
FIG. 3 provides a partial sectional view of an embodiment of an axle assembly and a radial compressor unit taken along the line 3—3 of FIG. 2.
Figure 4A:
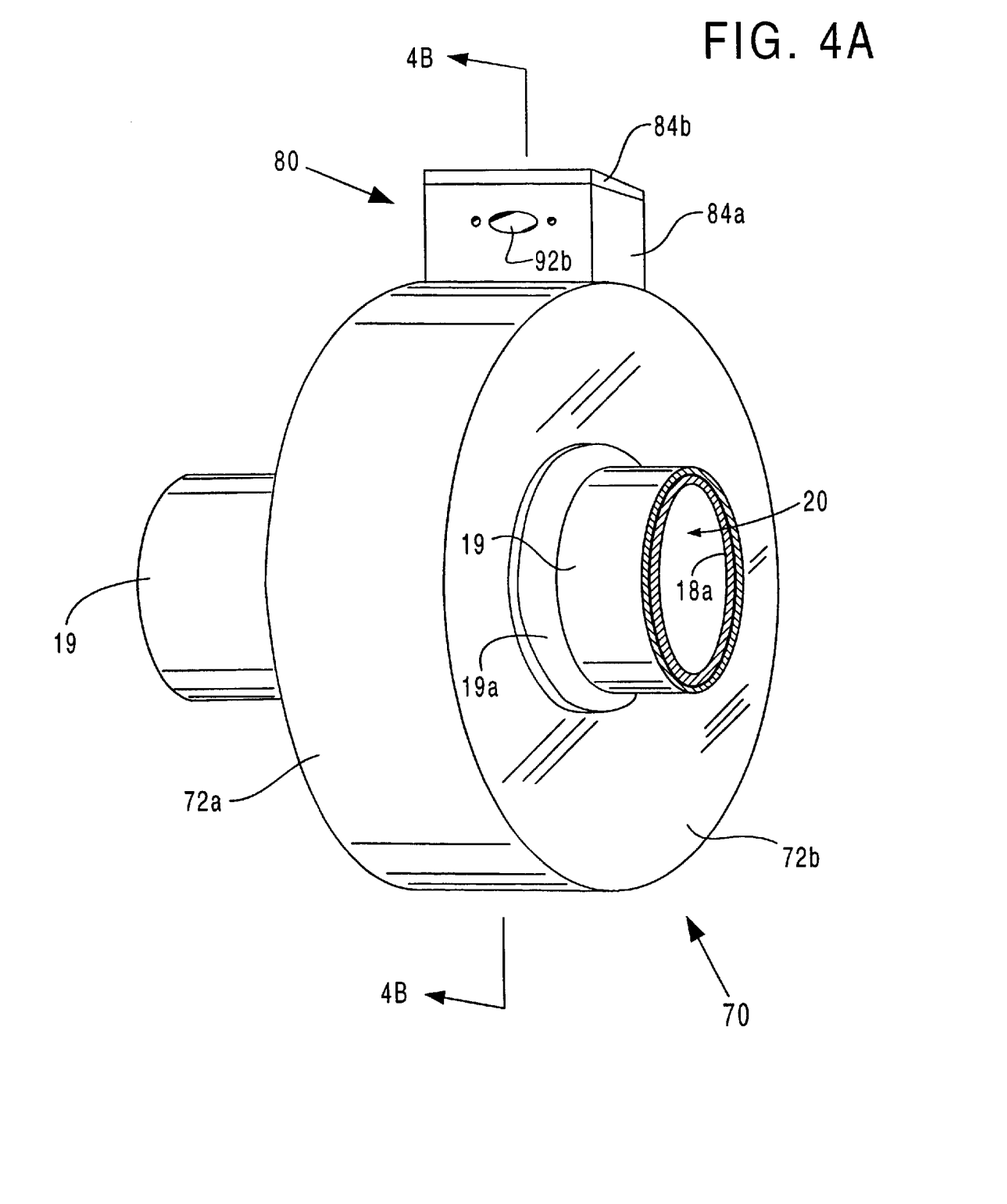
FIG. 4A provides a perspective view consistent with the embodiment of the radial compressor unit of FIG. 3.

An axle assembly 18 of the invention is preferably structured having an elongated and hollow configuration. An interior chamber 20 of the axle assembly 18, as best seen in FIGS. 3 and 4A, establishes an interior volume for holding a volume of filtered air. The axle assembly 18 further includes a substantially cylindrical outer wall structure 19—which may be provided as a plurality of segmented sections interposed between radial compressor units 70. This embodiment of the axle assembly 18 is depicted in FIG. 2. The longitudinal outer end portions of the axle assembly 18 are preferably configured as filtered air intake ports 48 for enabling filtered ambient air to pass into the interior chamber 20 of the axle assembly 18.

As shown in FIGS. 3 and 4A, the axle assembly 18 of the present invention is further structured with a rotatable tubular drive member 18a having portions thereof disposed within the outer wall structure 19 (or segmented portions thereof). The rotatable tubular drive member 18a is operatively coupled for driving and rotating when one or more pneumatic powered motors 16 is energized. Accordingly, when energized with a flow of pressurized air, a pneumatic powered motor 16 will cause the rotating of the tubular drive member 18a. With at least one of the plurality of spaced and rotatably mounted drive wheels 14 coupled to the rotatable tubular drive member 18a of the axle assembly 18, this rotating causes wheels 14 of the vehicle 12 to rotate and propel the vehicle.

As can be clearly seen in FIGS. 1 through 4B, the present invention further includes a plurality of radial compressor units 70, which are structured having few moving parts. Each compressor unit 70 is disposed, in a preferably juxtaposed arrangement as shown in FIG. 2, about and operatively coupled to the tubular drive member 18a of axle assembly 18. As such, at the same time a pneumatic powered motor is rotating the tubular drive member 18a and propelling the vehicle, one or more compressor units 70 may be enabled and driven by the tubular drive member 18a. Importantly, a driving or energizing of an enabled compressor unit 70 causes a drawing of filtered air from the interior chamber 20 of the axle assembly 18, and a produces pressurized air at an air outlet port 92 of the compressor unit. This pressurized air is then coupled to reservoir tank 40 for replenishing the volume of pressurized air available for propelling the vehicle.

Although it is contemplated that the compressor units 70 would be enabled whenever possible, it may be advantageous to selectively enable and disable respective compressor units while the propulsion system of the invention is operating. Importantly, when a compressor unit 70 is enabled, a rotational drag is placed upon the rotation of the tubular drive member 18a. Further, when a compressor unit 70 is disabled and not providing pressurized air to a reservoir tank 40, the rotational drag placed upon the tubular drive member 18a is substantially reduced. For example, a reduction in rotational drag caused by the disabling of a respective compressor unit 70 may be assumed to be in the range of 30% to 90% of the drag caused by that compressor unit when enabled. Accordingly, the disabling of one or more respective compressors unit 70 will result in more power or torque being available for rotating the tubular drive member 18a and propelling the vehicle 12. It may also be advantageous to disable one or more compressor units when the reservoir tanks are substantially filled and a demand for pressurized air to power the pneumatic powered motors 16 is low.

Returning to FIGS. 1 and 2, the pressurized air produced by each enabled compressor unit 70 may most preferably be coupled to a reservoir tank 40 by way of an in-line pressure activated pneumatic check valve 36. Each check valve 36 is structured having an air inlet side 36a and an air outlet side 36b. The check valves 36 are further structured for permitting only a unidirectional flowing of air from the air inlet side 36a to the air outlet side 36b when the pneumatic pressure present at the inlet side of the check valve 36 exceeds the pneumatic pressure present on the outlet side. Accordingly, as clearly shown in FIG. 1, the air inlet side 36a of the check valve is functionally coupled to accept air from an air outlet port 92 of a compressor unit 70, with the air outlet side 36b of a check valve arranged to deliver pressurized to at least one pneumatic reservoir tank 40.

The present invention may be termed a regenerative pneumatic system as the release of pressurized air to power the pneumatic powered motors 16, causes the tubular drive member 18a to be rotated, which in turn causes the rotating and driving of the compressor units 70, which in turn produces and returns pressurized air back to the pneumatic reservoir tanks 40. It may be noted that during intervals of operation when the load on the pneumatic powered motors is low, it may be possible to actually charge the reservoir tanks 40 by placing more pressurized air into a reservoir tank 40 that is being demanded to power the vehicle 12. For example, when traveling downhill on a slope. However, during intervals of an increased or heavy load, such as when climbing a hill or slope, pressurized air will typically be drawn from the reservoir tanks 40 at a higher rate that it is replenished. As such, the pneumatic vehicle of the present invention may need to be periodically 'recharged' at an available location having a source of pressurized air that is coupleable to each reservoir tank for refilling.

Turning again to FIGS. 1 and 2, the propulsion system 10 of the invention may further include means to enable an operator of the vehicle to couple a selected and adjustable flow of pressurized air from a reservoir tank 40, by way of a pneumatic control module 35, to at least one pneumatic powered motor 16. The pneumatic control module 35 receives pressurized air from a reservoir tank 40 through a pneumatic output coupling 44. A plurality of controls, including a forward/reverse control 30 and an accelerator control 28, enable the operator to regulate the direction of rotation, applied torque, etc., of the pneumatic powered motors 16 to propel the vehicle 12 in the controlled and desired manner. The selected and adjustable flow of pressurized air, as selected by the operator, flows from the pneumatic control module 35, by way of pneumatic drive couplings 46, to one or more of the pneumatic powered motors 16. It must be understood that the pneumatic drive couplings 46 may most preferably be provided as a plurality or bundle of pneumatic lines or couplings. For example, it may be desirable to have a first pneumatic coupling from the pneumatic control module 35 to the pneumatic powered motor 16 to cause the vehicle 12 to move in a first direction, while a second pneumatic coupling or line from the control module 35 to the pneumatic powered motor 16 may cause the vehicle 12 to move in a second direction. Which coupling is actually utilized at any time may be determined, for example, by the forward/reverse control 30, and other available controls. As such, it must be understood that the means may actually couple pressurized air to one or more of a plurality of pneumatic lines, each of which is coupled to a pneumatic powered motor 16, a pneumatically actuated braking assembly, an air powered motor 26, etc., to control a variety of operating parameters associated with powering and propelling the vehicle 12.

Returning to FIG. 1, one or more wheels 14 of the vehicle 12 may be mounted upon a drive hub 14a, which is most preferably coupled to rotate with the tubular drive member 18a of the axle assembly 18. As can be seen in FIG. 1, the drive hub is arranged with an open center. This opening, along with a second opening located on the opposite end of the axle assembly 18, may each be termed a filtered air intake port 48 and fitted with a suitable filter to enable filtered air to be drawn into the interior chamber 20.

As best seen in FIG. 1, in order to slow and stop the vehicle 12 a brake unit 50 may be associated with each wheel 14. However, the brake unit 50, as depicted in FIG. 1, may actually be coupled to brake the tubular drive member near each wheel, as required, or alternately, mounted directly to a wheel assembly of the vehicle 12 to slow the rotation of a wheel 14 thereof. A braking and control module 52, which includes a pressurized air input from the reservoir tanks 40, receives input from an operator via braking control input 52a. As depicted in FIG. 1, outputs from the brake control module 52, including pneumatic braking couplings 56, enable an operator to effect braking and slowing of the vehicle 12.

As illustrated in FIGS. 1 and 2, there is also provided with the vehicle 12 a pneumatically powered generator 24, which is driven by an air powered motor 26. The rate of charging may be electronically controlled via the electronics and control module 34 or by an inline electronically controlled pneumatic valve 26*a*. The generator 24 is provided to charge the battery 22 and power the electronics and control module 34 and other electrical and electronic systems of the vehicle 12 and propulsion system 10.

Skilled person will appreciate that the present invention may be modified, most preferably to provide an extended range of operation. Such a modification may be realized by including 'hybrid' propulsion techniques. For example, as shown in FIG. 1, a hybrid compressor module 76, say driven by a small internal combustion engine or solar powered motor, may be included to couple pressurized air to the reservoir tanks via a pneumatic coupling 76*a*. Alternately, the hybrid compressor module 76 may enable a vehicle to be 'plugged in' to cause a running of a compressor to charge the reservoir tank 40 while the vehicle is not being operated.

In order to improve the efficiency of the propulsion system 10 of the invention, it may be desirable to couple exhaust air discharged from a pneumatic powered motor 16 back into a reservoir tank. For example, as can be seen in FIG. 1, an exhaust air coupling 46*a* may be included that couples exhaust air from a pneumatic powered motor 16 by way of a check valve 36 back to a reservoir tank 40.

Referring now to FIG. 3, a partial sectional view is provided depicting an embodiment of an axle assembly 18 and radial compressor unit 70 taken along the line 3—3 of FIG. 2. As clearly shown, each radial compressor unit 70 includes a housing 72, comprising a cylindrical sleeve portion 72*a* (best seen in FIG. 4A) and two side plates 72*b*. Each side plate 72*b* is fixed at an opposing end of the cylindrical sleeve portion 72*a* to establish an interior volume. An outer wall structure 19 of the axle assembly 18 may be fixed to the housing 72 as shown in FIGS. 3 and 4A, with a rotatable tubular drive member 18*a* passing through the outer wall structure 19 (or a segment thereof) and each radial compressor unit 70. As illustrated the outer wall structure 19 may be configured with a flange 19*a*, which may facilitate attaching to the side plate 72*b* or other possible and providable structures. It may be noted that the radial compressor units 70 of FIGS. 2 through 4A, may be less disk-shaped, as depicted, and more cylindrical in shape. As such the diameter of a cylindrical sleeve portion 72*a* may actually be equal to or less than the cylindrical height of the sleeve portion 72*a*.

As can be seen in FIG. 3, an air outlet block 80 is included that is structurally and operatively coupled to the housing 72 of the compressor unit 70. The air outlet block 80 is preferably provided with a plurality of air output couplers 32*a* and 32*b*, respectively. As will be fully addressed below, a rotating of the tubular drive member 18*a* in a first rotational direction causes pressurized air to be produced and provided at a first output coupler, say air output coupler 32*a*. In addition, should the tubular drive member 18*a* be rotated in a second, opposite rotational direction, pressurized air is produced and provided an alternate output couple, such as second air output coupler 32*b*. As such, the compressor units 70 in accordance with the present invention are structured to provide pressurized air for replenishing one or more reservoir tanks 40 when the tubular drive member 18*a* is rotated in either a first or second rotational direction.

Figure 4B:
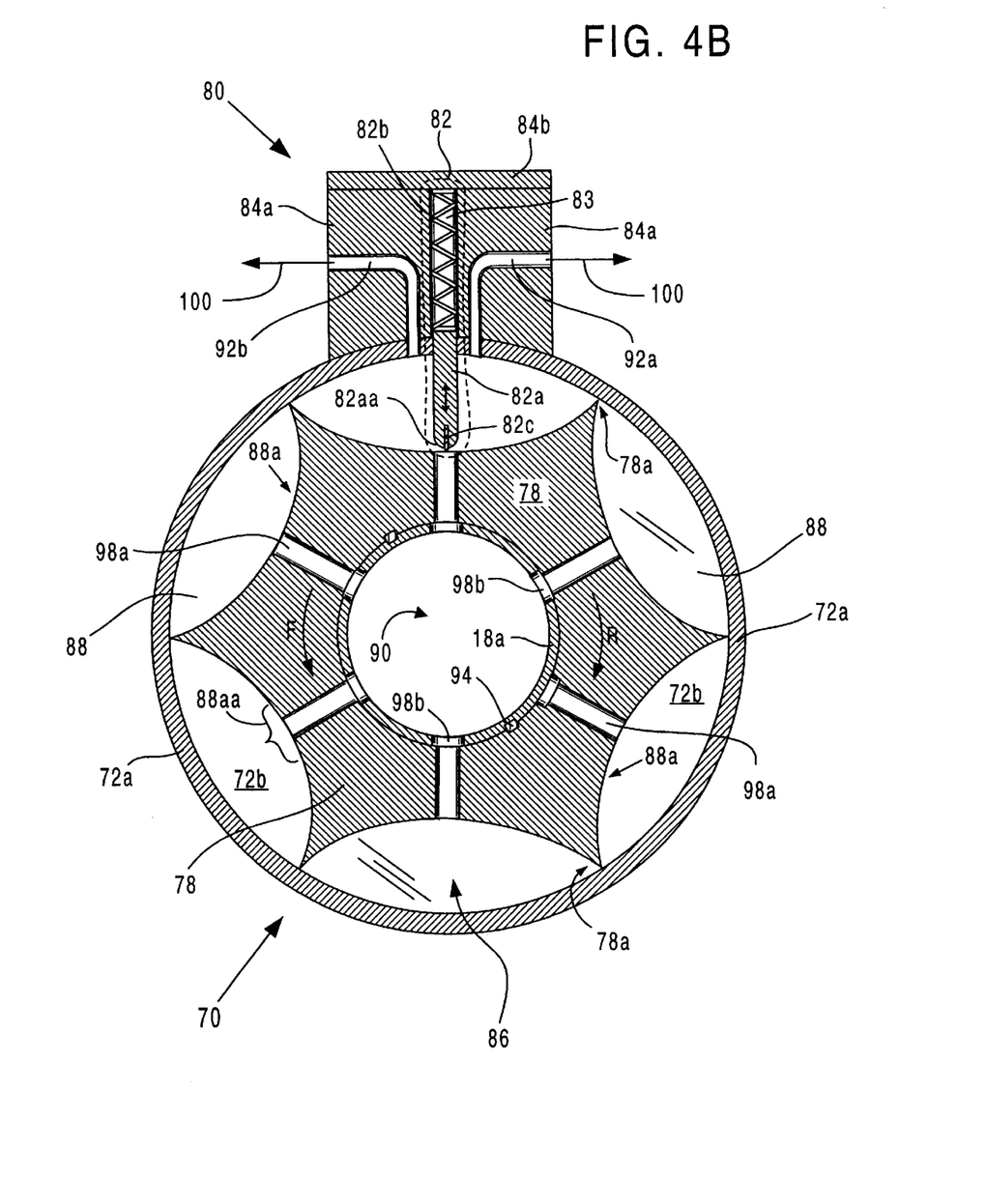
FIG. 4B provides a sectional view depicting internal structures of an embodiment of a radial compressor unit of FIG. 4A taken along the line 4B—4B.

As can be seen in FIGS. 4A and 4B, the air outlet block 80 includes a housing block 84*a* and a housing cover 84*b*. It may be noted that for convenience the housing block 84*a* and a housing cover 84*b* may be collectively referred to as housing 84. The housing block 84*a* is depicted with an air output coupler removed—exposing an air outlet port 94*b* of the compressor unit 70. As shown, the housing 84 is structured with a plurality of air outlet ports, 94*a* and 94*b*, each of which is mutually exclusively capable of providing pressurized air any one time. Further, the housing block 84*a* includes a centrally located, vertically oriented slot 83, which provides a cavity for enabling the air blade 82*a* to be movable to a retracted position.

The operational nature of the compressor unit 70 is best examined by way of FIG. 4B. As shown, a compression rotor 78 is housed within the interior volume of the housing 72 and structured for rotating about the center axis of the cylindrical sleeve portion 72*a* in either the first rotational direction F or the second rotational direction R. The compression rotor 78 is configured with an axial bore 90 that is sized to accommodate and enable a direct coupling to the tubular drive member 18*a*. For example, such a coupling may be aided by inclusion of coupling keys 94, along with other providable means. The compression rotor 78 is further structured having a modified cylindrical shape. As can be seen in FIG. 4B, an outer cylindrical radial perimeter of the compression rotor 78 is modified by a plurality of equi-spaced concaved cutouts or troughs 88. The troughs 88 are distributed circumferentially about the compression rotor 78. As illustrated, the troughs form, in combination with interior surfaces of the cylindrical sleeve portion 72*a* and the side plates 72*b*, a plurality of spaced and rotatable internal sub-chambers 86. It is air contained in the sub-chambers 86 that is compressed as each sub-chamber is rotated past an air blade mechanism 82 of the present invention.

As can be further seen in FIG. 4B, the compression rotor 78 is additionally configured with a plurality of spaced radial bores 98*a*. Each radial bore 98*a* extends radially between a bottom surface region 88*aa* of a trough 88 and the axial bore 90. An air passage hole 98*b* is formed in the tubular drive member 18*a* for each radial bore 98*a*. Accordingly, and as clearly illustrated, each radial bore 98*a* and air passage hole 98*b* form an air conduit for drawing air from an interior chamber 20 of the tubular drive member 18*a* into a sub-chamber 86 for pressurizing as the compression rotor 78 is rotated.

The air blade mechanism 82 of FIG. 4B includes a radially retractable air blade 82*a* having a substantially flattened wiping edge 82*aa*. The wiping edge 82*aa* is arranged for contacting a concaved surface of a trough 88, as illustrated. Importantly, the air blade 82*a* is movable or slidable between a first extended position (as illustrated) and a second retracted position. The air blade 82*a* is moved to the retracted position, wherein the air blade 82*a* is substantially located within the bore 83 of the housing block 84*a*, when the compression rotor 78 has rotated one of the sleeve contacting rotor points 78*a* into a position of substantial alignment with the air blade 82*a*. Accordingly, the air blade 82*a* cycles between these two position extremes, extended and retracted, as the compression rotor 78 rotates. When in the extended position, as shown in FIG. 4B, continued rotation, say in the first rotational direction F, causes a volume of pressurized air 100 to be forced by the air blade 82*a* out of air outlet port 92*a* of the compressor unit 70. As shown in FIG. 1, the pressurized air would be coupled from an air outlet port 92 of the air outlet block 80 into an air inlet side 36*a* of check valve 36 via a pressurized air coupling 38.

The pressurized air 100, which can only cause a flowing of air in the direction indicated upon the check valve, passes through the check valve 36 and out an air outlet side 36b. The air outlet side 36b is coupled to the pneumatic reservoir tank 40.

Therefore, as the compression rotor 78 is rotated in the first rotational direction F, pressurized air is produced and provided at air outlet port 92a, which may be termed a first outlet port. Alternately, if the compression rotor 78 is rotated in the second rotational direction R, pressurized air is then produced and provided at air outlet port 92b, which may be termed a second outlet port.

In order to keep the wiping edge 82aa in constant contact with the concaved surface 88a of a trough 88, the air blade mechanism 82 includes a biasing means. In the embodiment of FIG. 4B, the bias means is a simple arrangement of one or more bias springs 82b. It should be understood that the inclusion of each radial bore 98 of each trough 88 causes only a small loss of curved surface area when compared to the total area of the curved surface 88a. As such, as the cross sectional thickness of the air blade 82a is much less than the width of the blade, the wiping edge 82aa of the air blade 82a easily traverses the openings of the radial bores 98a. (It may be noted that the width of the air blade is illustrated as extending into the page of FIG. 4B.) This easy traversal of the openings will even be the case if several radial bores are provided, say one behind the next.

As further shown in FIG. 4B wiping seal 82c may be included at the wiping edge 82aa. The wiping seal 82c may most preferably be provided in a U-shaped configuration to also provide for contacting and reducing air loss at the side plates 72b as pressurized air is being produced by a rotating the compression rotor 78.

It is important to understand that the present invention is disclosed in a most preferred embodiment as a wheeled vehicle. However, it is fully contemplated that the structures of the invention may be adapted to power or propel other items or vehicles. For example, the invention may be adapted to propel vehicles such as watercraft, snow mobiles, etc. Alternately, the pneumatic propulsion system 10 may be employed to drive a generator or pump if desired. Further, while there have been described a plurality of the currently preferred embodiments of the present invention, other variations are certainly possible. For example, consider the compression rotor of FIG. 4B. The embodiment depicted has six troughs 88, with sleeve contacting rotor points 78a delimiting each trough. However, an actual number of troughs provided may be varied greater or less than illustrated. Additionally, less pointed and more rounded delimiting regions may be employed with a 'wiping seal' (not illustrated) included where the outer surfaces of the compression rotor 78 meet the inner surface of the cylindrical sleeve portion 72a. Accordingly, those skilled in the art will recognize that many other and further modifications may be made without departing from the invention and it is intended to claim all modifications and variations as fall within the scope of the invention and the appended claims.

What is claimed is:

1. A vehicle powered by a regenerative pneumatic propulsion system, comprising:

a vehicle including a chassis and a plurality of spaced rotatably mounted wheels;

at least one pneumatic powered motor supported upon an axle assembly of the vehicle;

the axle assembly structure having an elongated and hollow configuration, with an outer wall structure establishing, at least in part, an interior volume, the axle assembly further arranged with a rotatable tubular drive member having portions disposed within the outer wall structure and operatively coupled to be driven by the pneumatic powered motor to cause a rotating of the tubular drive member;

the axle assembly further arranged with a plurality of filtered air intake ports to enable filtered ambient air to enter the interior volume of the axle assembly;

at least one rotatably mounted wheel coupled to the tubular drive member of the axle assembly to rotate therewith for propelling the vehicle;

a plurality of radial compressor units mounted to the axle assembly and operatively coupled to the tubular drive member of the axle assembly so that as the tubular drive member rotates, each compressor unit may be enabled causing a drawing of filtered air from the interior volume of the axle assembly, and producing pressurized air at an air outlet port of the compressor unit;

at least one pneumatic reservoir tank structured to accept the pressurized air from the air outlet port so as to increase a volume of pressurized air available in a reservoir tank to propel the vehicle; and means to enable an operator of the vehicle to couple a selected and adjustable flow of pressurized air from a reservoir tank to a pneumatic powered motor to thereby enable the operator to propel and operate the vehicle.

2. The vehicle in accordance with claim 1, wherein the radial compressor units are arranged in a juxtaposed arrangement, with each compressor unit positioned between a pair of spaced wheels rotatably mounted at each end of the axle assembly.

3. The vehicle in accordance with claim 2, wherein the radial compressor units are substantially cylindrical in shaped.

4. The vehicle in accordance with claim 3, wherein each of the juxtaposed compressor units can be selectively enabled and disabled, such that:

a) when enabled a rotational drag is placed upon the rotation of the tubular drive member as pressurized air is produced and transferred to a reservoir tank, and b) when disabled the rotational drag is reduced with the compressor unit disabled and not providing pressurized air to a reservoir tank.

5. The vehicle in accordance with claim 4, including an electronics and control module for determining when a need for increased power to propel the vehicle should result in a disabling of one or more compressor units for an interval of time to enable increased power to be coupled to at least one pneumatic powered motor to propel the vehicle.

6. The vehicle in accordance with claim 5, wherein compressor units are further selectively disabled by the electronics and control module when the reservoir tanks are substantially filled while a demand for pressurized air to power pneumatic powered motors is low.

7. The vehicle in accordance with claim 2, wherein the means to enable an operator of the vehicle to couple a selected and adjustable flow of pressurized air from a reservoir tank to a pneumatic powered motor includes a pneumatic valve.

8. A pneumatically powered vehicle structured with a chassis having fixed thereto a regenerative pneumatic propulsion system for rotating at least one drive wheel of the vehicle, the propulsion system of the vehicle comprising:

at least one pneumatic powered motor fixed to an end of an axle assembly of the propulsion system;

the axle assembly structure having an elongated and hollow configuration, with an outer wall structure establishing an interior volume, the axle assembly further arranged with a rotatable tubular drive member having portions thereof disposed within the outer wall structure and operatively coupled for rotating by the pneumatic powered motor causing a rotating of the tubular drive member and at least one drive wheel of the vehicle coupled thereto for propelling of the vehicle;

the axle assembly further arranged with a plurality of filtered air intake ports to enable filtered ambient air to enter the interior volume of the axle assembly;

a plurality of radial compressor units mounted to the axle assembly and disposed about and operatively coupled to the tubular drive member of the axle assembly so that as the tubular drive member rotates, each compressor unit may be enabled causing a drawing of filtered air from the interior volume of the axle assembly and a producing of pressurized air at an air outlet port of the radial compressor unit;

at least one pneumatic reservoir tank structured to accept the pressurized air from the air outlet ports of radial compressor units, so as to increase a volume of pressurized air available in the reservoir tank;

at least one pneumatic valve placed in-line with a coupling between the reservoir tank and the pneumatic powered motors, which is controllable for delivering to each pneumatic powered motor a selected and adjustable flow of pressurized air from a reservoir tank, thereby enabling a controlled propelling of the vehicle.

9. The propulsion system in accordance with claim 8, wherein an electronics and control module is included to enable compressor units to be selectively:

a) enabled, causing a rotational drag to be placed upon a rotating of the rotatable tubular drive member of the axle assembly, with the enabled compressor units causing pressurized air to be produced and transferred to a reservoir tank; and b) disabled, causing a rotational drag placed upon a rotating of the rotatable tubular drive member to be reduced, with the disabled compressor unit not producing and providing pressurized air to a reservoir tank.

10. The propulsion system in accordance with claim 9, wherein the electronics and control module determines when a need for power to propel the vehicle should result in a disabling of one or more compressor units to enable additional power to be employed to propel the vehicle.

11. The propulsion system in accordance with claim 9, including a plurality of in-line pressure activated pneumatic check valves, each check valve having an air inlet side and an air outlet side and structured for permitting a unidirectional flowing of air from the air inlet side to the air outlet side when pressure present at an air inlet side of the check valve exceeds the pressure present on an air outlet side, wherein the air inlet side of the check valve is coupled to accept air from an air outlet port of a compressor unit, and the air outlet side of the check valve is coupled to the reservoir tank.

* * * * *